United States Patent [19]

McCandless

[11] Patent Number: 4,924,838

[45] Date of Patent: May 15, 1990

[54] CHARGE AIR FUEL COOLER

[75] Inventor: James C. McCandless, Rolling Meadows, Ill.

[73] Assignee: Navistar International Transportation Corp., Chicago, Ill.

[21] Appl. No.: 343,989

[22] Filed: Apr. 26, 1989

[51] Int. Cl.$^5$ .......................................... F02M 31/20
[52] U.S. Cl. ................... 123/541; 165/156; 123/514
[58] Field of Search .............. 123/541, 514, 510, 556; 165/156, 154

[56] References Cited

U.S. PATENT DOCUMENTS

| | | | |
|---|---|---|---|
| 1,953,809 | 4/1934 | Kenneweg | 123/541 |
| 2,120,779 | 6/1930 | Ericson | 123/41.31 |
| 2,994,311 | 8/1961 | Shuck | 123/541 |
| 3,468,371 | 9/1969 | Menze | 165/156 |
| 3,593,694 | 7/1971 | Hilborn | 123/39 |
| 3,973,536 | 8/1976 | Zelders | 123/541 |
| 4,015,567 | 4/1977 | Zabenskie | 165/156 |
| 4,285,316 | 8/1981 | Stolz et al. | 123/541 |
| 4,821,797 | 4/1989 | Allgauer et al. | 165/154 |

FOREIGN PATENT DOCUMENTS 0135316 8/1983 Japan ................... 123/541

Primary Examiner—Willis R. Wolfe
Assistant Examiner—M. Macy
Attorney, Agent, or Firm—F. David AuBuchon; Dennis K. Sullivan

[57] ABSTRACT

In combination with a diesel engine, an engine air intake conduit leading preferably to a turbocharger, a source of fuel, and a circuitous fuel path supplying fuel to the engine from the source and returning uncombusted fuel from the engine to the source, is a fuel cooler. The fuel cooler is mounted within the engine air intake conduit upstream of the turbocharger, if present, in a manner allowing intake air to flow through a central passageway of the cooler to the turbocharger. The fuel cooler is further engaged within the circuitous fuel path in a manner allowing heated fuel to travel through a peripheral passageway formed in the fuel cooler. The peripheral passageway is contiguous to the central passageway whereby heat from the heated fuel is transferred to the intake air, thus cooling the fuel. The fuel cooler is used preferably in cooling uncombusted diesel fuel being returned toward the storage tanks of a vehicle from the engine. The fuel cooler comprises an elongate cylindrical body including an integrally molded heat exchanger therein. The heat exchanger has a continuous, convoluted inner wall defining a central passageway therewithin which extends longitudinally through the elongate cylindrical body. The elongate cylindrical body also has a tightly spiralled peripheral passageway cored therein, an inner surface of which forms an outer wall of the heat exchanger. The elongate cylindrical body also has two ports therein, each positioned toward an opposite end of the cylindrical body and opening into and communicating with the cored peripheral passageway.

13 Claims, 2 Drawing Sheets

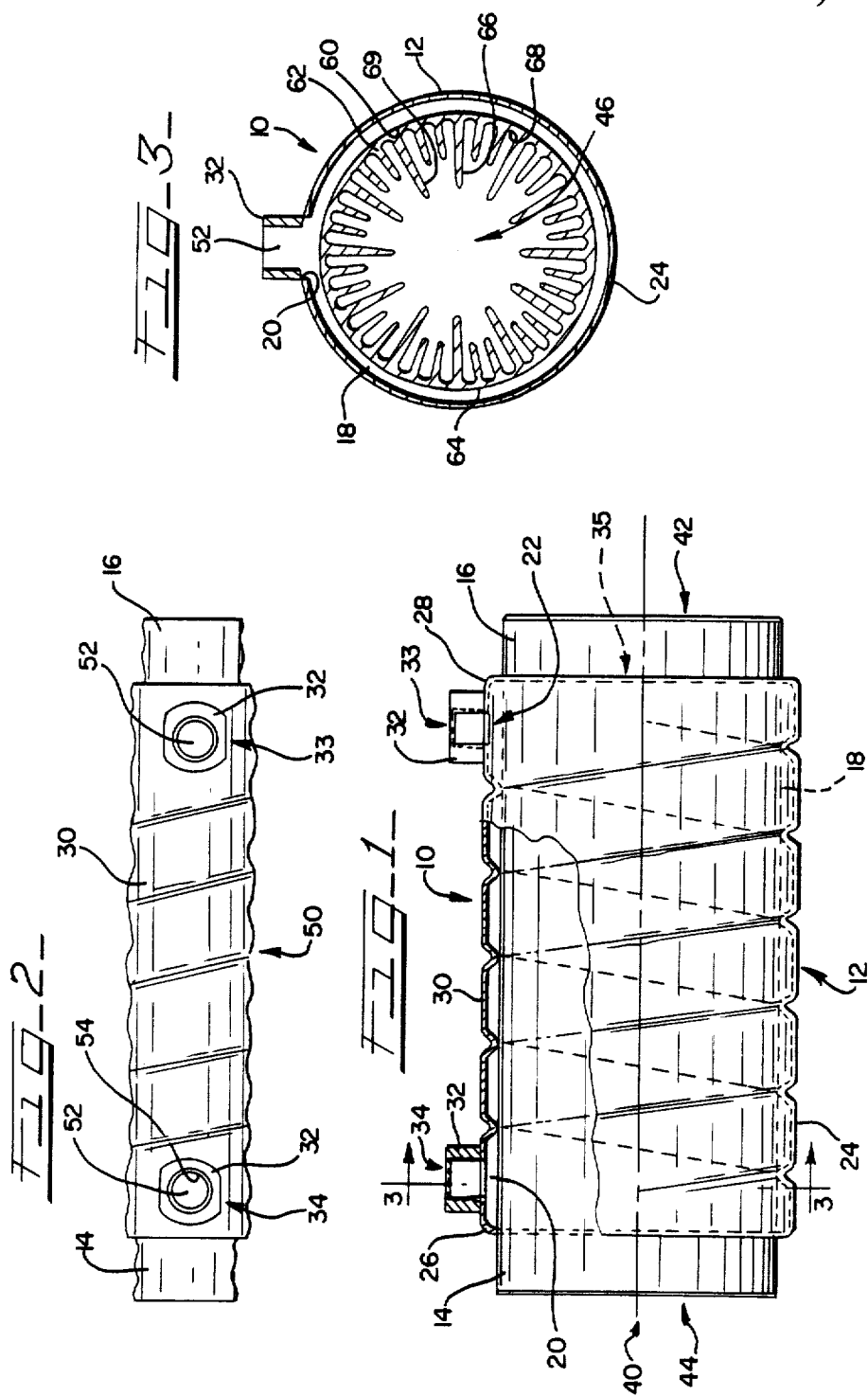

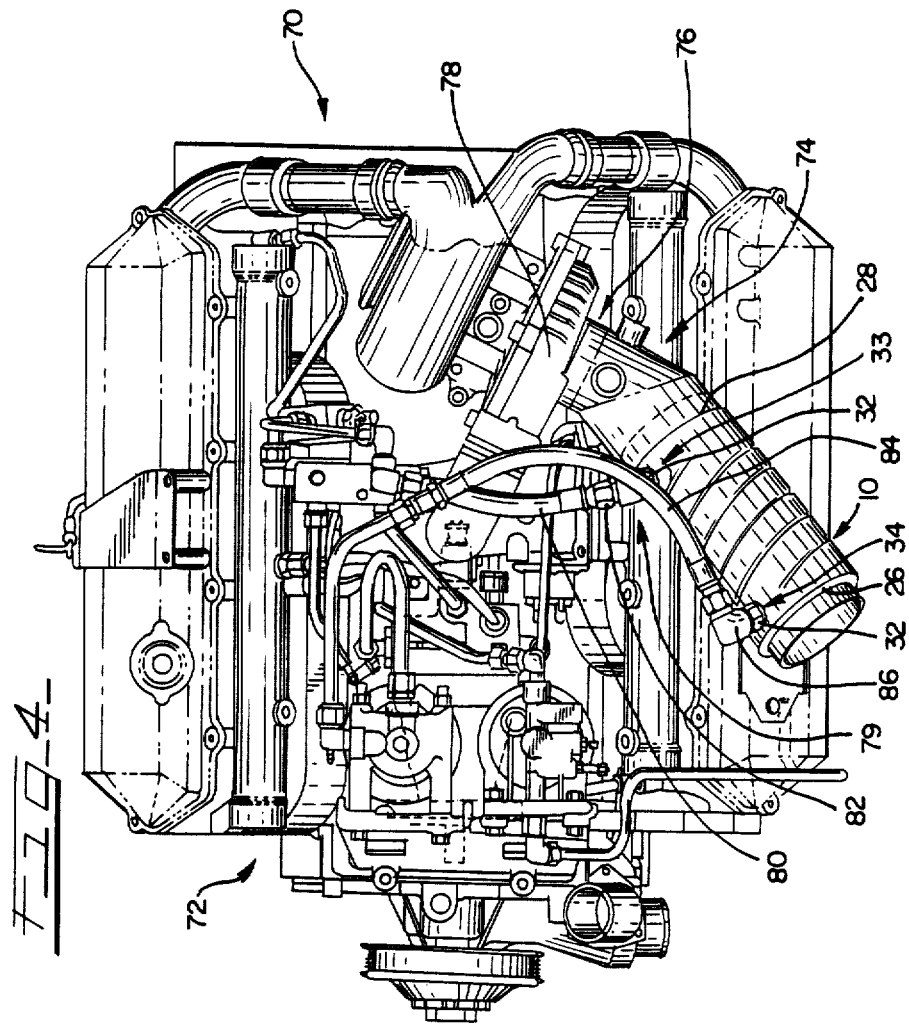

CHARGE AIR FUEL COOLER

BACKGROUND OF THE INVENTION

The present invention relates to a fuel cooler for use in combination with a diesel engine, especially one having a common rail fuel system. More particularly, the invention relates to a fuel cooler which cools fuel returning toward the fuel tanks from the engine, utilizing engine charge air to perform such cooling.

DESCRIPTION OF THE PRIOR ART

Heretofore it has been proposed to provide a fuel cooler in various engines. Examples of such a fuel cooler are disclosed in the following U.S. patents:

| U.S. Pat. No. | Patentee |
|---|---|
| 1,953,809 | Kenneweg |
| 2,120,799 | Ericson |
| 3,593,694 | Hilborn |
| 3,973,536 | Zelders |
| 4,285,316 | Stolz |
| 4,491,117 | Koide |

The Kenneweg U.S. Pat. No. 1,953,809 discloses a liquid fuel or carburetor cooler which comprises a radiating device placed between the intake manifold of an internal combustion engine and the carburetor. The radiating device is provided with an axial passageway having radiators or fins therein. Vaporized fuel from the carburetor is drawn through the passageway, with the fuel being led around the radiators or fins so that the liquid fuel is cooled by the heat absorption from vaporizing the fuel. The fuel is then conducted to the carburetor bowl where it is vaporized, with the vaporization of each successive volume of fuel acting to cool succeeding volumes of fuel being delivered to the carburetor bowl.

The Ericson U.S. Pat. No. 2,120,799 discloses a fuel cooling device for preventing fuel from entering the fuel pump in a heated condition. The cooler comprises a container having a porous covering and a mechanism for feeding liquid from the container to the porous covering to keep it damp. the cooling device is mounted adjacent the fuel conduit in a position to be exposed to drafts generated during operation of the vehicle for facilitating evaporation of the liquid from the covering, thus causing cooling of the adjacent fuel conduit and fuel therein.

The Hillborn U.S. Pat. No. 3,593,694 discloses a fuel cooling system for cooling liquid fuel to avoid vapor lock in the system. The system comprises a fuel injection nozzle which injects fuel into an intake tube which is connected to an intake manifold. The injected fuel vaporizes. A fuel cooling jacket surrounds the intake tube and liquid fuel is passed therethrough. The fuel passing through the jacket is cooled by the latent heat of vaporization from the vaporized fuel within the intake tube.

The Elders U.S. Pat. No. 3,973,536 discloses a device for feeding fuel to a diesel engine which includes means for substantially equalizing the temperature of fuel in a return conduit and in a feed conduit. The equalization is accomplished by the provision of a cooler within the return conduit or a heat exchanger in the fuel storage tank for the system.

The Stolz U.S. Pat. No. 4,285,316 discloses a fuel system for a motor vehicle which incorporates an air/-liquid heat exchanger in the fuel system which is traversed on the liquid side by fuel and on the air side by ventilated air discharged out of the passenger space.

The Koide U.S. Pat. No. 4,491,117 discloses an apparatus for supplying cooled fuel to an engine. A fuel distribution tube is provided which includes a fuel passage in close proximity to a coolant passage. Fuel in the fuel passage is cooled, by heat exchange with coolant in the coolant passage, prior to being injected into the engine by fuel injectors of the system.

As will be described in greater detail hereinafter, the fuel cooler of the present invention differs from those previously proposed by first of all being specific for use in a diesel engine having a common rail fuel system, and secondly, by cooling fuel in the return line feeding the fuel storage tank. The cooler uses engine charge air for the coolant, and thus, secondarily, heats inlet charge air to the engine, which is helpful for emission purposes when the vehicle is operating under light loads or is at idle.

SUMMARY OF THE INVENTION

According to the invention there is provided in combination with a diesel engine, an engine air intake conduit leading to the intake manifold, a source of fuel, and a circuitous fuel path supplying fuel to the engine from the source and returning uncombusted fuel from the engine to the source, a fuel cooler mounted within said engine air intake conduit upstream of any air thermodynamic state changing device in a manner allowing intake air to flow through a central passageway of said cooler to said air state changing device is present, and further being engaged within said circuitous fuel path in a manner allowing heated fuel to travel through a peripheral passageway formed in said fuel cooler, said peripheral passageway being contiguous to said central passageway whereby heat from said heated fuel is transferred to said intake air, thus cooling the fuel.

Further according to the invention there is provided a fuel cooler for use, for example, in cooling uncombusted diesel fuel being returned to storage tanks of a vehicle from the engine thereof comprising:

an elongate cylindrical body including integrally molded heat exhange means therein;

said heat exchange means having a continuous, convoluted inner wall defining a central passageway therewithin which extends longitudinally through said elongate cylindrical body;

said elongate cylindrical body having a tightly spiralled peripheral passageway cored therein, an inner surface of said spiralled passageway forming an outer wall of said heat exchange means;

said elongate cylindrical body also having two ports therein, each positioned toward an opposite end of said cylindrical body and opening into and communicating with an end of said cored peripheral passageway.

BRIEF DESCRIPTION OF THE DRAWINGS

Other objects and advantages of the invention will become more apparent upon perusal of the detailed description thereof and upon reference to the drawings in which:

FIG. 1 is a side elevation partly in section of a charge air fuel cooler constructed in accordance with the invention;

FIG. 2 is a plan view of a portion of the fuel cooler of FIG. 1 illustrating the fuel inlet and outlet ports thereon;

FIG. 3 is a diametral cross section of the fuel cooler of FIG. 1 taken along the line 3—3 thereof; and, FIG. 4 is a plan view of a turbocharged internal combustion engine incorporating the charge air fuel cooler of FIG. 1.

DESCRIPTION OF THE PREFERRED EMBODIMENT

Referring now to the drawings in greater detail, there is illustrated in FIG. 1 a charge air fuel cooler 10 made in accordance with the teachings of the present invention, for use in a common rail diesel fuel system.

As shown, the fuel cooler 10 includes a cylindrical body portion 12 having inwardly stepped integrally molded end collars 14 and 16 thereon.

The fuel cooler 10 is die cast or extruded of aluminum and the body portion 12 thereof includes, as illustrated in phantom, a cored peripheral passageway 18 therein which has a spiral configuration. Access to the cored peripheral passageway 18 is gained through ports 20 and 22 provided in an outer wall 24 of the cylindrical body portion 12.

The ports 20 and 22 are placed at predetermined positions, one toward either end 26 or 28 of the cylindrical body portion 12, and on a longitudinal line along an outer surface 30 of the outer wall 24, as best illustrated in FIG. 2. Identical port fittings 32 are mounted over each port 20, 22, forming an inlet 33 and an outlet 34 for the cored peripheral passageway 18 to complete a fuel circuit 35 of the cooler 10, as will be defined hereinafter. The fittings 32 may be made of aluminum and may be furnace brazed in place over the ports 20 and 22 in a fluid tight manner.

The integrally molded end collars 14 and 16, which are used in mounting the fuel cooler 10 within a charge air intake system (FIG. 4) of a diesel engine, define an inlet port 40 and an outlet port 42, respectively, for a central throughbore or passageway 46 which extends longitudinally through the cylindrical body portion 12.

The end collars 14 and 16 have a predetermined configuration and size so that, when the fuel cooler 10 is engaged within a charge air intake system (FIG. 4) of a diesel engine, as will be described hereinafter, the end collars 14 and 16 are received within the charge air intake line upstream of an air thermodynamic state changing device, such as turbocharger 78, (FIG. 4) of the engine in an airtight manner.

Turning now to FIG. 2, a longitudinal section 50 of the outer wall or surface 30 of the fuel cooler 10 is shown which incorporates therein the inlet and outlet ports 20 and 22 of the cored peripheral fuel passageway 18. As shown, the fittings 32 each have a bore 52 therein which is in communication with and forms a continuation of a respective port 20 or 22 of the cored peripheral fuel passageway 18 within the body portion 12, thus forming the inlet 33 and outlet 34 for the passageway 18.

The fittings 32 may be of a compression type and may be provided with a threaded interior surface 54 to form a female fitting 32 within which a male-type hose connector (FIG. 4) may be threadedly engaged, as will be described in greater detail in connection with the description of FIG. 4. In FIG. 3, there is shown a cross sectional view through the cylindrical body portion 12 of the fuel cooler 10 at a position where one of the fittings 32 is located.

As best shown here, the bore 52 of the fitting 32 communicates with the respective port 20 or 22 thereBeneath to provide access to the cored peripheral fuel passageway 18 of the fuel cooler 10.

It will be seen here that the central passageway 46 through the fuel cooler 10 encompasses a major area of the interior of the body portion 12.

Nestled between and separating the cored peripheral fuel passageway 15 and the central throughbore or passageway 46 is a heat exchanger 60 which is integrally molded with the body portion 12 of the fuel cooler 10.

The heat exchanger 60 includes a peripheral cylindrical wall portion 62, an outer surface 64 of which forms an inner wall surface 64 of the cored peripheral fuel passageway 18.

A plurality of fins 66 extend in a radially inwardly directed array from the wall portion 62 to form a convoluted inner wall 68 of the heat exchanger 60. The fins 66 are staggered in length in the embodiment disclosed and provide a greatly increased surface area to an inner wall surface 69 of the inner wall 68 of the heat exchanger 60. Such increased area of the inner wall surface 69 of the heat exchanger 60 will provide for more rapid dissipation of heat into the central passageway 46 as will be describd hereinafter. In this respect, when heated, uncombusted fuel exiting the engine (FIG. 4) is returned to storage tanks of a vehicle (not shown) via a fuel return system incorporating the fuel cooler 10 of the present invention, the fuel traverses the cored peripheral fuel passageway 15 of the fuel cooler 10, which is contiguous to the central passageway 46, and the heat from the fuel is transferred to or absorbed by the inner wall surface 64 of the cored peripheral fuel passageway 18, which, as defined above, also forms an outer surface 64 of the cylindrical wall portion 62 of the heat exchanger 60.

Since the cored peripheral fuel passageway 18 is tightly spiralled, the heated fuel travelling therethrough spends a greater length of time within the passageway 15 than it would flowing through a straight-flow passageway, thus allowing for a greater escape or transfer of heat from the fuel.

To effect a significant increase in the amount of heat that may be transferred from the fuel to the heat exchanger 60, the inner wall surface 69 of the heat exchanger 60 is convoluted, providing a significantly increased surface area of the wall surface 69 by the provision of the array of fins 66, which function as cooling fins 66.

The cooling fins 66 extend into the central passageway 46 through which charge air is consistently flowing in a direction toward the turbocharger 78 of the engine (FIG. 4).

The charge air flowing through the central passageway 46 of the fuel cooler 10 is relatively cool and, as it washes over the array of cooling fins 66 protruding into the passageway 46, the cool air within the passageway 46 is heated by the heat being absorbed by or transferred to the heat exchanger 60 from the heated fuel in the contiguous cored peripheral fuel passageway 15 and then being radiated radially inwardly into the cooling fins 66.

Thus, with the cored peripheral passageway 15 being in the form of a spiral, and providing an extended duration of contact of the heated fuel with the heat exchanger 60, and with the provision of an increased area to the inner surface 69 of the heat exchanger 60 by the array of staggered-in-length cooling fins 66, one develops a two-fold result.

The first result is that a significant amount of heat can be removed from the uncombusted fuel being returned to the storage tanks of a vehicle from the engine thereof.

The second result is that the charge air flowing to the engine is heated by an equally significant amount.

The heating of the intake charge air will provide decreased fuel consumption and decreased hydrocarbon production within the combustion chambers of the engine when the engine is operating under light loads or when the engine is idling.

Under heavy or full load conditions, wherein more fuel is used by the engine, less fuel is circulated through the return portion of the fuel system. On the other hand, much more air passes through the intake conduit, especially in a turbocharged engine. Accordingly, the increase in intake air temperature of the air passing through the fuel cooler should be substantially less at full load. In any event, although an increase in inlet air temperature will reduce the fuel efficiency of the engine at full load to some extent, the horsepower loss experienced as a result of the increased air temperature can easily be compensated for in most diesel engines by an increase in the settings of the engine governor.

FIG. 4 shows a diesel engine 70 of the type including a circuitous, common rail fuel system 72 and shows the fuel cooler 10 of the present invention mounted within a charge air intake line 74 of the engine 70 just upstream of an inlet 76 to a turbocharger 78 of the engine 70. The charge air then travels from an outlet of the turbocharger 78 to the combustion chambers of the engine 70.

The engagement of the fuel cooler 10 within a fuel return system 79 from the engine 70, as an example, is also shown.

Here a first fuel return line 80, through which uncombusted fuel from the engine 70 is shunted, is shown connected by a suitable connector 82 to the port fitting 32 of the inlet 33 to the cored peripheral passageway 18 of the fuel cooler 10.

After the fuel travels through the cored peripheral fuel passageway 15, it exits the port fitting 32 of the outlet 34, to which a second fuel return line 84 is engaged by a suitable connector 86. The second fuel return line 84 is engaged by a suitable connector 86. The second fuel return line 84 transports the cooled fuel to the vehicle storage tanks.

It is to be noted here that the fuel being cooled enters the fuel cooler 10 at the end 28 of the cylindrical body portion 12 and exits at the end 26 of the cylindrical body portion 12. In this way, the fuel at its hottest is cooled at a position closest to the turbocharger 78 by charge air that has already been heated slightly by the significantly cooler fuel that is about to exit the fuel cooler 10 and has been cooled to the most significant degree by the cool air initially entering the central passageway 46 at the end 26 of the cooler 10.

In other words, the flow of the fuel through cored peripheral passageway 18 of the fuel cooler 10 is in a direction opposite to the direction of travel of the cool charge air through the central passageway 46 of the fuel cooler 10.

Although the fuel cooler 10 is defined above with respect to its position within the fuel return system 79, this is to be considered the optimum location because the amount of fuel returned is inversely proportional to the amount of fuel used by the engine. Thus as the engine is loaded, there is less fuel to cool. So long as the location of the fuel cooler 10 within the charge air intake line 70 is upstream of any intake air thermodynamic state changing device, such as the turbocharger 78, the fuel cooler 10 will function within other lines, such as the supply line, of the circuitous fuel system albeit less efficiently. The class of intake air thermodynamic state changing devices referred to does not include filters, which do not change the thermodynamic state of the intake air as turbochargers and carburetors do, such that the fuel cooler 10 is placed downstream of such filter without compromising the efficacy thereof. It should be understood that an intake air state changing device is not necessary to the operation of the fuel cooler. However, if such a device is present, it must be downstream of the fuel cooler.

As described above, the fuel cooler 10 of the present invention has a number of advantages, some of which have been described above and others of which are inherent in the invention.

It is to be understood that modifications may be made to the fuel cooler 10 of the present invention without departing from the teachings of the present invention and accordingly, the scope of the invention should only be limited as defined by the accompanying claims.

I claim:

1. A fuel cooler for use in cooling uncombusted diesel fuel being returned to storage tanks of a vehicle from the engine thereof comprising:
    an elongate cylindrical body including integrally molded heat exchange means therein;
    said heat exchange means having a continuous, convoluted, cylindrical inner wall defining a central passageway therewithin which extends longitudinally through said elongate cylindrical body, said wall having an array of projections extending radially inwardly therefrom into said central passageway, wherein said projections are fins;
    said elongate cylindrical body having a tightly spiralled peripheral passageway cored therein, an inner surface of said spiralled passageway forming an outer wall of said heat exchange means;
    said elongate cylindrical body also having two ports therein, each positioned toward an opposite end of said cylindrical body and opening into and communicating with an end of said cored peripheral passageway.

2. The fuel cooler of claim 1 wherein said fins are of at least two lengths.

3. The fuel cooler of claim 2 wherein said fins of each length are staggered in said array.

4. In combination with a diesel engine having an intake manifold, an engine air intake conduit leading to said intake manifold, a source of fuel, and a circuitous fuel path having a section supplying fuel to the engine from the source and returning uncombusted fuel from the engine to the source, a fuel cooler mounted within said engine air intake conduit upstream of any intake air thermodynamic state changing device in a manner allowing intake air to flow through a central passageway of said cooler toward said intake manifold and further being engaged within said circuitous fuel path in a manner allowing heated fuel to travel through a peripheral passageway formed in said fuel cooler, said peripheral passageway being contiguous to said central passageway whereby heat from said heated fuel is transferred to said intake air, thus cooling the fuel.

5. The combination of claim 4 wherein a turbocharger is disposed in said intake air conduit between said fuel cooler and said intake manifold.

6. The combination of claim 4 wherein said circuitous fuel path is a common rail fuel system.

7. The combination of claim 6 wherein said fuel cooler is operatively disposed in said return section of said fuel path.

8. The combination of claim 4 wherein said peripheral passageway is a cored spiral passageway.

9. The combination of claim 4 wherein said contiguous fuel and air passageways are separated by a heat exchanger.

10. The combination of claim 9 wherein said heat exchanger is integrally molded within said fuel cooler.

11. The combination of claim 4 wherein said peripheral passageway is a fuel passageway having connector fittings associated therewith which are adapted to engage a fuel line in a liquid tight manner.

12. The combination of claim 14 wherein said fuel cooler includes end collars which are sized and configured to be engaged within said intake air conduit in an airtight manner.

13. In combination with a diesel engine, an engine air intake conduit leading to a turbocharger, a source of fuel, and a circuitous fuel path supplying fuel to the engine from the source and returning uncombusted fuel from the engine to the source, a fuel cooler mounted within said engine air intake conduit upstream of said turbocharger in a manner allowing intake air to flow through a central passageway of said cooler to said turbocharger and further being engaged within a return fuel line of said circuitous fuel path in a manner allowing heated, uncombusted return fuel to travel through a peripheral passageway formed in said fuel cooler, said peripheral passageway being contiguous to said central passageway whereby heat from said heated fuel is transferred to said intake air, thus cooling the fuel.

* * * * *